(12) United States Patent
Powals

(10) Patent No.: US 7,556,286 B2
(45) Date of Patent: Jul. 7, 2009

(54) EXTENDED INFLATABLE COVERAGE OF INFLATABLE CURTAINS

(75) Inventor: Brian J. Powals, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 220 days.

(21) Appl. No.: 11/222,006

(22) Filed: Sep. 8, 2005

(65) Prior Publication Data

US 2007/0052212 A1 Mar. 8, 2007

(51) Int. Cl.
*B60R 21/20* (2006.01)

(52) U.S. Cl. .................................. 280/730.2

(58) Field of Classification Search ........... 280/730.2, 280/743.1
See application file for complete search history.

(56) References Cited

U.S. PATENT DOCUMENTS

| | | | |
|---|---|---|---|
| 6,155,596 A * | 12/2000 | Nakajima et al. | 280/730.2 |
| 6,527,296 B2 * | 3/2003 | Bakhsh et al. | 280/730.2 |
| 6,568,706 B2 | 5/2003 | Mueller | 280/730.2 |
| 6,575,496 B2 | 6/2003 | Hess et al. | 280/730.2 |
| 7,264,267 B2 * | 9/2007 | Kino et al. | 280/728.2 |
| 2004/0100077 A1 * | 5/2004 | Ogata | 280/730.2 |
| 2005/0127644 A1 * | 6/2005 | Kino et al. | 280/730.2 |
| 2005/0212270 A1 * | 9/2005 | Wipasuramonton et al. | 280/730.2 |
| 2005/0285378 A1 * | 12/2005 | Noguchi et al. | 280/730.2 |
| 2006/0066080 A1 * | 3/2006 | Ikeda et al. | 280/730.2 |
| 2006/0125213 A1 * | 6/2006 | Kruse | 280/730.2 |
| 2007/0001434 A1 * | 1/2007 | Berntsson | 280/730.2 |

\* cited by examiner

*Primary Examiner*—Faye M. Fleming
(74) *Attorney, Agent, or Firm*—Sally J Brown; Stoel Rives LLP

(57) ABSTRACT

An inflatable curtain airbag module is disclosed. The airbag module may include an inflatable curtain that has several inflatable chambers, at least one of which provides impact protection below an A-pillar of a vehicle. The chamber below the A-pillar may be bottom-filled, while the other chambers are top-filled. The airbag module may also include a sail panel attached to the inflatable curtain at an angle with respect to a direction of compaction of the inflatable curtain.

15 Claims, 7 Drawing Sheets

EXTENDED INFLATABLE COVERAGE OF INFLATABLE CURTAINS

TECHNICAL FIELD

The present disclosure relates generally to the field of automotive protective systems. More specifically, the present disclosure relates to inflatable curtain airbag configurations.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the invention's scope, the embodiments will be described and explained with specificity and detail in reference to the accompanying drawings in which:

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Figure 1:
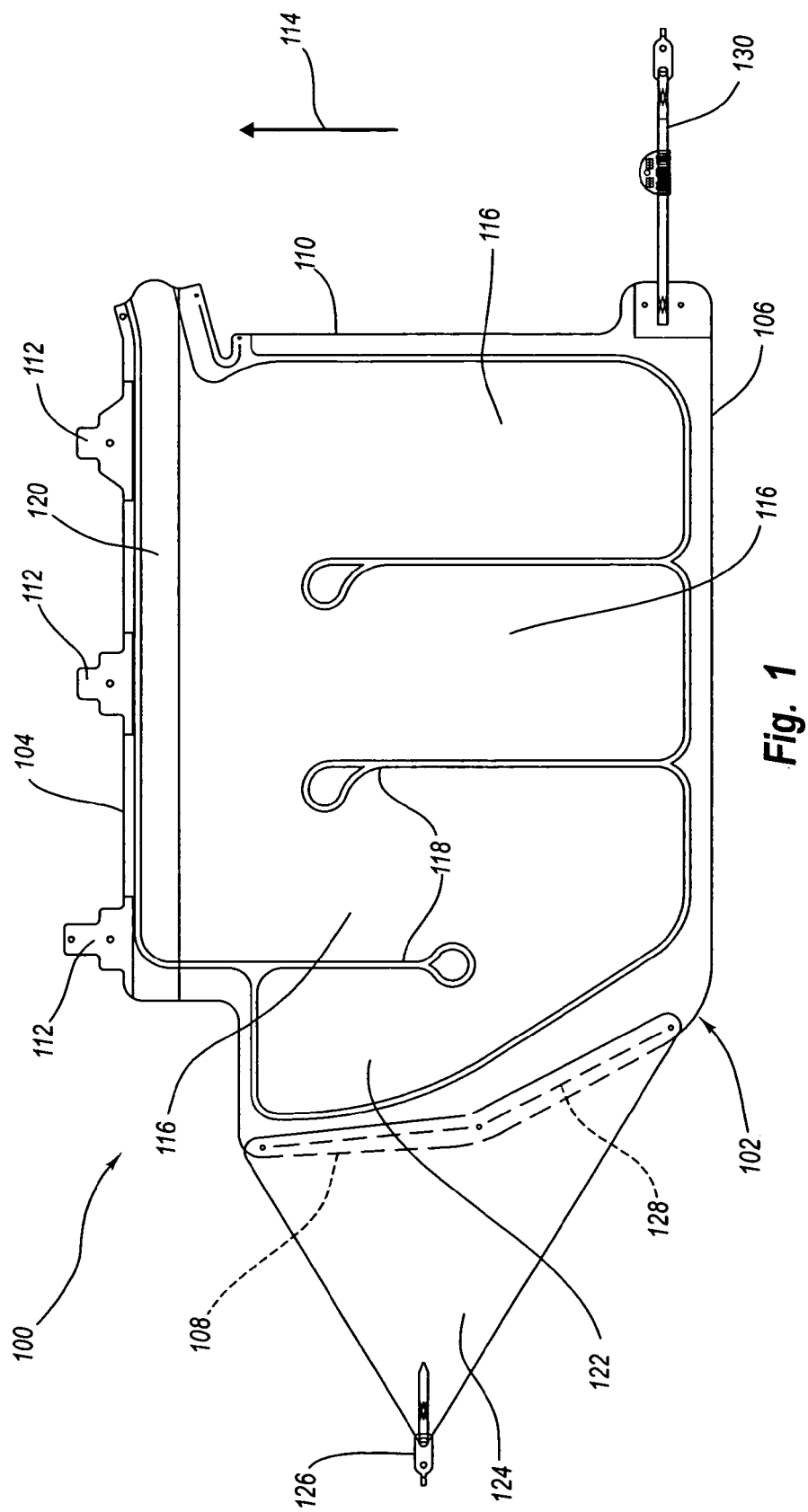
FIG. 1 is a side elevation view of one embodiment of an inflatable curtain airbag cushion.

FIG. 1 represents one embodiment of an inflatable curtain airbag module 100 as shown from a side elevation view. The airbag module 100 is configured to provide impact protection for vehicular occupants in a lateral collision or rollover event. The module 100 includes an inflatable curtain 102 having a top edge 104, a bottom edge 106, a front edge 108 and a back edge 110. The top edge 104 of the inflatable curtain 102 is configured to be mounted to, or adjacent to, a roof rail along a lateral side of a vehicle. The inflatable curtain 102 may be mounted to the vehicle through mounting tabs 112, clips or brackets that may be disposed along the top edge 104 of the curtain 102. According to the embodiment depicted, the inflatable curtain 102 provides impact protection for a vehicular occupant between the A- and B-pillars of a vehicle.

The inflatable curtain 102 is shown in a deployed state where the bottom edge 106 is spaced apart from the top edge 104. Before inflation, the inflatable curtain 102 is in an undeployed state and is disposed behind the vehicle trim and/or between the headliner and roof rail of the vehicle. The curtain 102 may be folded or rolled, or a combination thereof, in a direction of compaction (shown as arrow 114), in order to place the inflatable curtain 102 in a compacted, undeployed state. Typically, the direction of compaction 114 is opposite the direction the curtain 102 deploys.

According to the embodiment depicted, the direction of compaction 114 is vertical, or approximately perpendicular to the top and bottom edges 104, 106. In other embodiments, the curtain 102 need not be compacted perpendicular to the top edge 104, but may be compacted at an alternative angle.

The inflatable curtain 102 includes several inflatable chambers that provide impact protection for the vehicular occupant. For example, the curtain 102 includes three top-filling chambers 116, which receive inflation gas from adjacent the top edge 104 of the curtain. Internal seams 118, along with the curtain edges 104, 106, 108, 110, define the top-filling chambers 116. The internal seams 118 at least partially define the top-filling chambers 116 by extending from the bottom edge 106 toward the top edge 104, but not reaching the top edge 104. Inflation gas that is generated by an inflator (not shown) may travel along an internal gas duct 120, disposed along the top edge 104, and into the top-filling chambers 116.

The inflatable curtain 102 may also include a bottom-filling chamber 122 adjacent the front edge 108. The bottom-filling chamber 122 receives inflation gas from adjacent the bottom edge 106 of the curtain. An internal seam 118 at least partially defines the bottom-filling chamber 122 along with the front edge 108 of the inflatable curtain 102. The internal seam 118 extends from the top edge 104 toward the bottom edge 106, but does not reach the bottom edge 106, leaving a gap so inflation gas may pass there through. Inflation gas may travel from the internal gas duct 120 into a top-filling chamber 116. Once the top-filling chamber 116 has begun inflating, inflation gas may then pass through the top-filling chamber 116 into the bottom-filling chamber 122.

The bottom-filling chamber 122 depicted in this specific embodiment is configured to provide impact protection below an A-pillar of a vehicle. In an undeployed state, the bottom-filling chamber 122 may be housed or otherwise mounted along the A-pillar, such as behind the garnish trim. In alternative embodiments the bottom-filling chamber could be located elsewhere on the inflatable curtain 102. If delayed inflation of a portion of the inflatable curtain 102 is desirable, other than solely adjacent the A-pillar, the bottom-filling chamber 122 may be disposed in that location.

As the inflatable curtain 102 is deployed, inflation gas begins filling the top-filling chambers 116 initially. This causes the curtain 102 to leave its housed position and enter into the vehicle cabin, typically through the trim interface between the headliner and the garnish trim. The curtain may deploy from its housed position behind the trim before the bottom-filling chamber 122 is inflated, i.e., after the top-filling chambers 116 have received inflation gas. The configuration of the internal seams 118 and structure of the inflatable curtain 102 essentially delays the inflation of the bottom-filling chamber 122 until the curtain 102 has moved from its housed position. This may minimize the possibility of fragmenting the A-pillar trim during deployment of the inflatable curtain 102.

Referring still to FIG. 1, when deployed, the bottom-filling chamber 122 may also extend at an angle relative to the direction of compaction 114. By extending at an angle relative to the direction of compaction 114, impact protection is provided below the A-pillar, which extends from adjacent the roof rail of the vehicle, down toward the dashboard. Furthermore, when the inflatable curtain 102 is compacted through folding or rolling or a combination of folding and rolling, less material is folded/rolled over on itself compared to a chamber that extends perpendicularly from the top edge 104. This helps to minimize the package size of the inflatable curtain envelope that is placed behind the A-pillar garnish trim.

The inflatable curtain airbag module 100 also may include a sail panel 124 that is coupled to an attachment location 126 on the vehicle, and also coupled to the front edge 108 of the inflatable curtain 102. The sail panel 124 may be attached along the front edge 108 of the inflatable curtain at an angle with respect to the direction of compaction 114.

In conventional systems, the sail panel is sewn to the front edge vertically in the direction of compaction 114. When rolled and/or folded into its stowed/housed configuration, the stitching is rolled over itself requiring a larger packaging space as compared to the remaining portions of the inflatable curtain wrap.

In the embodiment depicted in FIG. 1, the sail panel 124 is coupled along the front edge 108 of the inflatable curtain 102 at an angle, by a seam 128. The angle may be selected such that during compaction, one end of the seam 128 is prevented from overlapping the other end of the seam 128. Additionally, the angle may be selected so that overlap of the seam 128 with itself is avoided along the length of the seam 128. Furthermore, the sail panel 124 may be attached along the front edge 108 of the inflatable curtain 102 at various angles. This aspect of the sail panel 124 will be discussed in greater detail in conjunction with the description accompanying FIG. 3.

The inflatable curtain airbag module 100 may also optionally include a tether 130 that may be part of an active, pretensioning tethering system, or a passive tethering system. The tether 130 may be attached to, or adjacent to, the back edge 110 of the inflatable curtain 102 near the bottom edge 106. The tether 130 may help to keep the inflatable curtain 102 between the side of the vehicle and the vehicular occupant when the curtain 102 is deployed.

Figure 2:
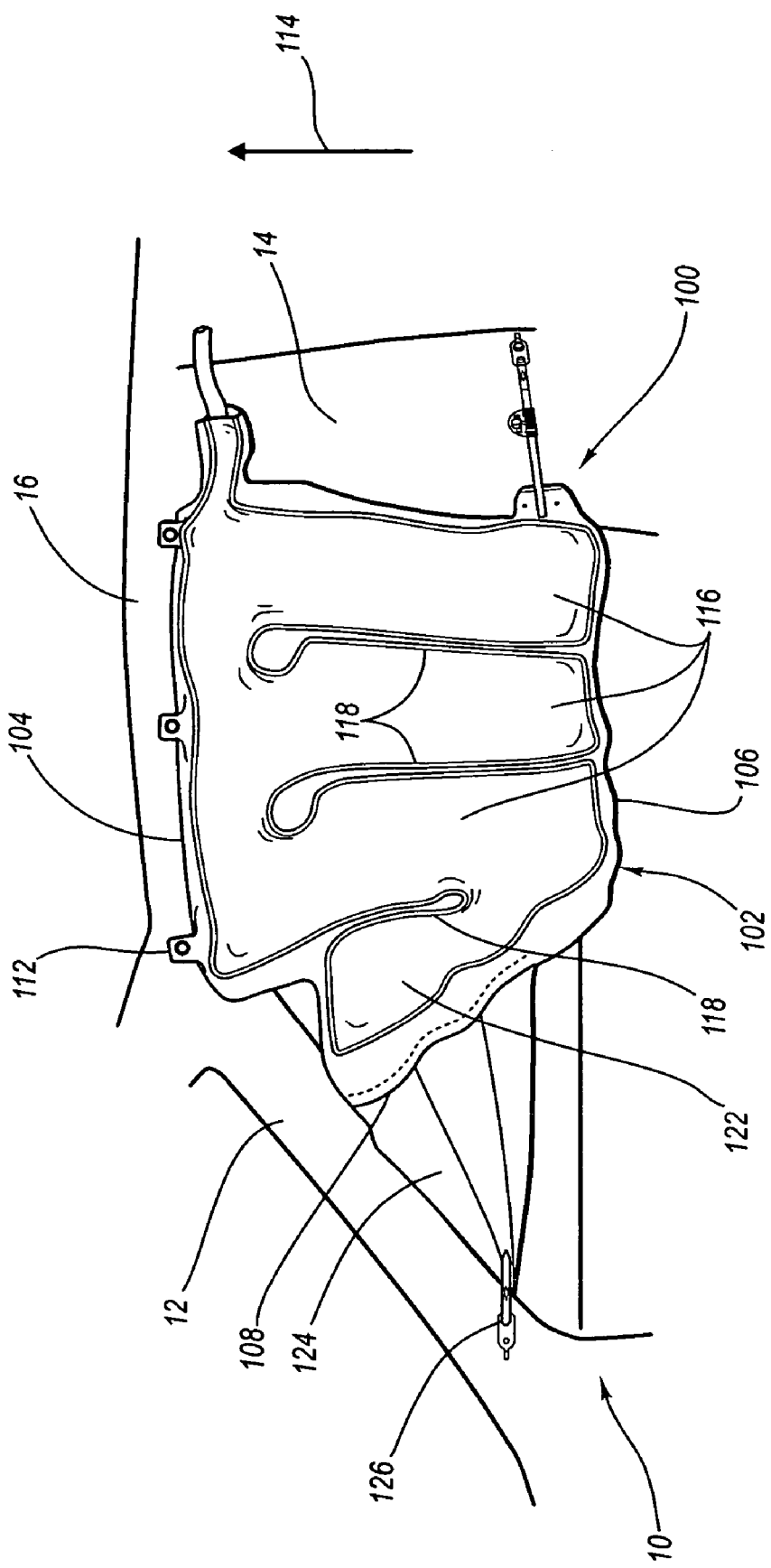
FIG. 2 is a perspective view of the inflatable curtain airbag cushion of FIG. 1, shown in a deployed state within a vehicle.

FIG. 2 represents the inflatable curtain airbag module 100 of FIG. 1 as shown from a perspective view in a deployed state within a vehicle 10. The inflatable curtain 102 is shown deployed between an A-pillar 12 and a B-pillar 14 of the vehicle 10. The inflatable curtain 102 provides for impact protection and occupant retention during lateral collision or rollover events.

The top edge 104 of the curtain 102 may be mounted to, or adjacent to, the roof rail 16 of the vehicle through mounting tabs 112. Alternative methods of attachment, such as mounting clips or brackets, are known to those having skill in the art and may be employed when installing the airbag module 100.

The inflatable curtain 102 includes top- and bottom-filling chambers 116, 122. The top-filling chambers 116 are at least partially defined by the internal seams 118 that extend from the bottom edge 106, toward, but not reaching the top edge 104. The bottom-filling chamber 122 is at least partially defined by the internal seam 118 that extends from the top edge 104 toward, but not reaching the bottom edge 106.

The bottom-filling chamber 122 deploys below the A-pillar 12. In its housed/undeployed state, the bottom-filling chamber 122 may be housed along the A-pillar 12 behind the A-pillar garnish trim. In its deployed state, the bottom-filling chamber 122 may extend at an angle with respect to the direction of compaction 114 of the inflatable curtain 102. By extending at an angle with respect to the direction of compaction 114, during compaction of the curtain 102, less material is folded and/or rolled over on itself, resulting in a smaller envelope that is placed behind the A-pillar garnish trim compared to chambers that extend parallel to the direction of compaction 114.

The airbag module 100 also may include a sail panel 124, as known to those having skill in the art. The sail panel 124 may be coupled to the front edge 108 of the curtain 102 at an angle with respect to the direction of compaction 114. The sail panel 124 may also be attached to the vehicle 10 at an attachment location 126.

Figure 3:
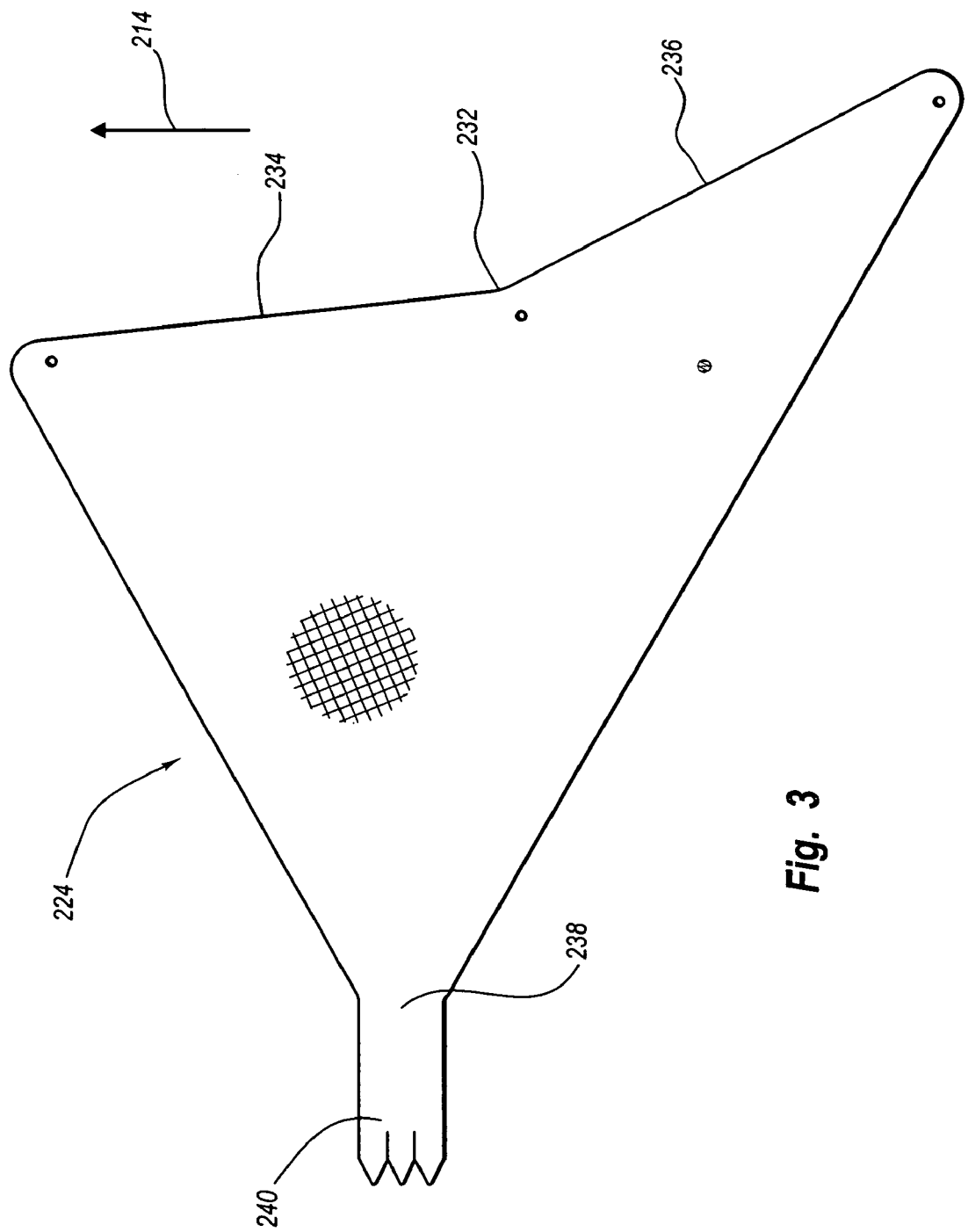
FIG. 3 is a side elevation view of one embodiment of a sail panel for coupling to an inflatable curtain airbag.

FIG. 3 represents one embodiment of a sail panel 224 for coupling to an inflatable curtain, as shown from a side elevation view. The sail panel 224 may have a somewhat triangular shape with a first side 232 that is attached to the front edge of the inflatable curtain. As was described in conjunction with the description accompanying FIGS. 1 and 2, the sail panel 224 is attached to the inflatable curtain at an angle with respect to a direction of compaction 214 of the curtain.

According to the embodiment depicted, the first side 232 of the sail panel 224 may be angled relative to the direction of compaction 214. Furthermore, the angle may vary along the first side 232. For example, a first portion 234 of the first side 232 is set at one angle, and a second portion 236 of the first side 232 is set an another angle. The second portion 236 may be set at an angle that deviates from the direction of compaction more than the angle at which the first portion 234 is set. Alternative configurations would be apparent to those having skill in the art, such as a curved configuration, where the angle may be equivalent to the tangent at a given point on the curve. Alternatively, a combination of curved and straight-angled configurations may also be used. Furthermore, the sail panel may have an angled portion and a non-angled portion along its first side.

The first side 232 may be coupled to the inflatable curtain through stitching, forming a seam along the first side 232. Since the sail panel 224 is angled along its first side 232 with respect to the direction of compaction, overlap of one end of the seam with the other end during compaction may be avoided. According to other embodiments, the seam may completely avoid overlapping with itself along the first side 232 or a portion of the first side 232 during compaction. The angled attachment of the sail panel 224 results in a smaller profile and smaller envelope size that the airbag module may be disposed in.

Opposite the first side 232 of the sail panel 224 is an apex 238 that may optionally include an attachment tab 240 to which a tether or other form of attaching mechanism may be affixed to couple the sail panel 224 to an attachment location within the vehicle.

Figure 4:
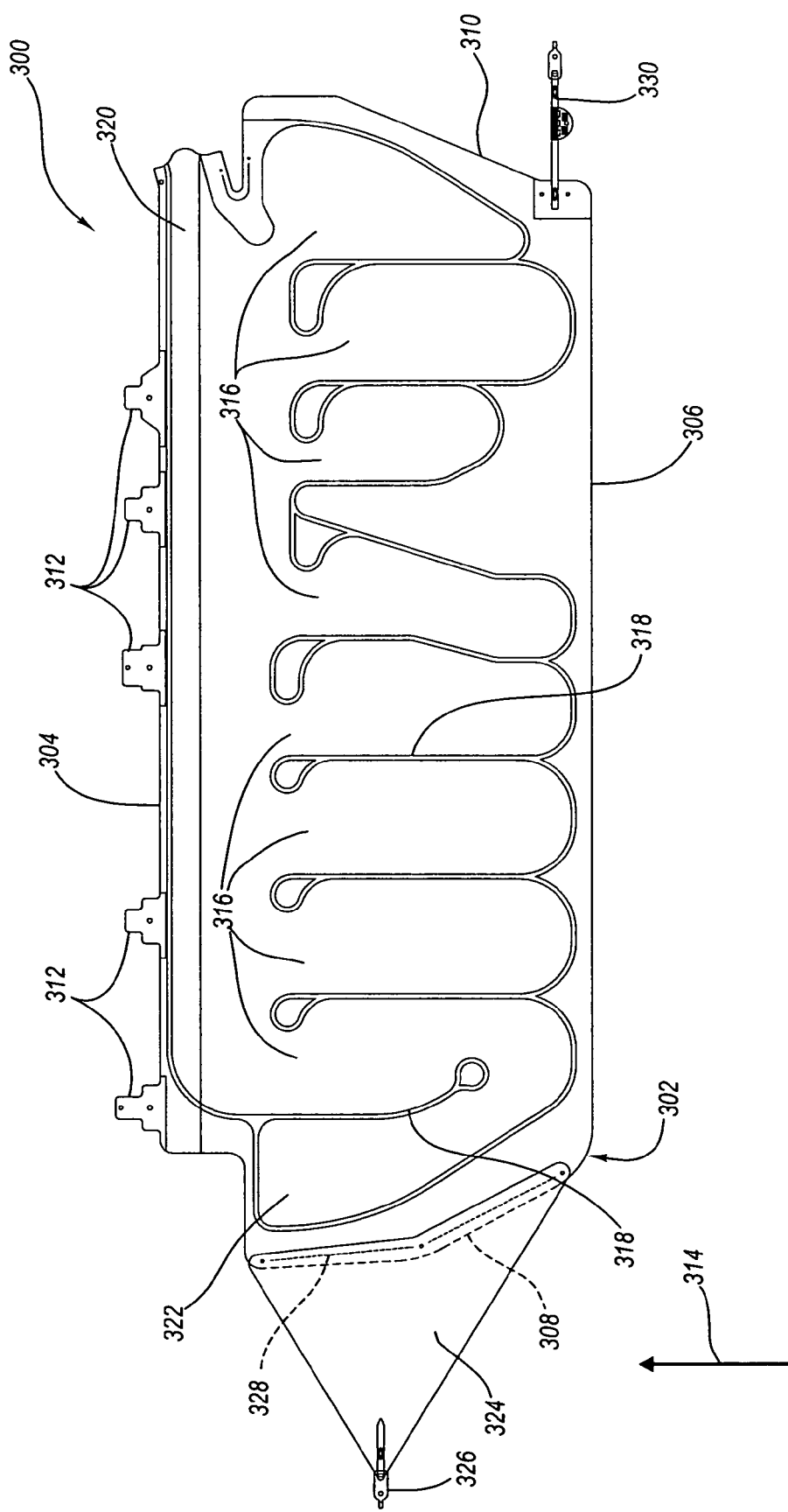
FIG. 4 is a side elevation view of another embodiment of an inflatable curtain airbag cushion.

FIG. 4 represents another embodiment of an inflatable curtain airbag module 300, as shown from a side elevation view. The airbag module 300 is configured to provide impact protection for a vehicular occupant between the A- and C-pillars of a vehicle. For example, the airbag module 300 depicted could be used in an extended cab model of a pick-up truck or similar vehicle. The airbag module 300 includes an inflatable curtain 302 having a top edge 304, a bottom edge 306, a front edge 308 and a back edge 310. Mounting tabs 312 may be disposed along the top edge 304 for mounting the curtain 302 to, or adjacent to, a roof rail of the vehicle. Alternatively, mounting clips or brackets or other methods of attachment known to those having skill in the art may be used.

The inflatable curtain 302 is depicted in a deployed state, where the bottom edge 306 is spread apart from the top edge 304. When moving the curtain 302 into an undeployed, compacted state behind the vehicle trim and/or between the headliner and roof rail, the curtain 302 may be folded or rolled, or a combination thereof, in a direction of compaction (shown as arrow 314). The direction of compaction 314 may be perpendicular to the top and bottom edges 304, 306 and is typically opposite the direction of deployment. In other embodiments, the curtain 302 need not be compacted perpendicular to the top edge 304, but may be compacted at an alternative angle.

The inflatable curtain 302 includes a plurality of inflatable chambers that provide impact protection for vehicular occupants. For example, the curtain 302 includes several top-filling chambers 316, which receive inflation gas from an internal gas duct 320 adjacent the top edge 304 of the curtain 302. Internal seams 318 help define the top-filling chambers 316 by extending from the bottom edge 306 toward the top edge 304, but not reaching the top edge 304, leaving a gap there between.

The inflatable curtain 302 also may include a bottom-filling chamber 322 adjacent its front edge 308. The bottom-filling chamber 322 receives inflation gas from adjacent the bottom edge 306 of the curtain. An internal seam 318 extending from the top edge 304 toward, but not reaching, the bottom edge 306 helps define the bottom-filling chamber 322. In order for the bottom-filling chamber 322 to inflate, inflation gas travels from the internal gas duct 320 and through the adjacent top-filling chamber 316, and then into the bottom-filling chamber 322. According to this embodiment, the flow path of the inflation gas into the bottom-filling chamber 322 is approximately U-shaped. Accordingly, the bottom-filling chamber 322 is designed to inflate after the top-filling chambers 316 have begun receiving inflation gas.

The bottom-filling chamber 322 is configured to provide impact protection below the A-pillar of the vehicle. In an undeployed state, the bottom-filling chamber 322 may be housed along the A-pillar, such as behind the garnish trim. When deployed, the bottom-filling chamber 322 may extend at an angle relative to the direction of compaction 314. This may help to minimize the envelope size of the inflatable curtain 302 adjacent the A-pillar when compacted. For example, when folding and/or rolling the curtain 302, less material of the bottom-filling chamber 322 is folded/rolled over on itself as compared to a chamber that does not extend at an angle.

The airbag module 300 may also include a sail panel 324 that is coupled along the front edge 308 of the curtain 302 and also to an attachment location 326 on the vehicle. The sail panel 324 may be coupled to the front edge 308 through a seam 328. The seam 328 may be set at an angle relative to the direction of compaction 314. The angle may be selected such that during compaction, overlap of one end of the seam 328 with the other end is avoided. Furthermore, the angle at which the sail panel 324 is attached to the curtain 302 may vary. For instance, the seam 328 may be disposed at multiple angles, or the seam 328 may be curved, such that a tangent to the curve at a given point is at an angle with respect to the direction of compaction 314.

The airbag module 300 may also include a tether 330 that may be part of an active tethering system, such as a pyrotechnic pretensioner system, or alternatively, a passive tethering system. The tether 330 may be attached to, or adjacent to, the back edge 310 of the inflatable curtain 302, near the bottom edge 306.

Figure 5:
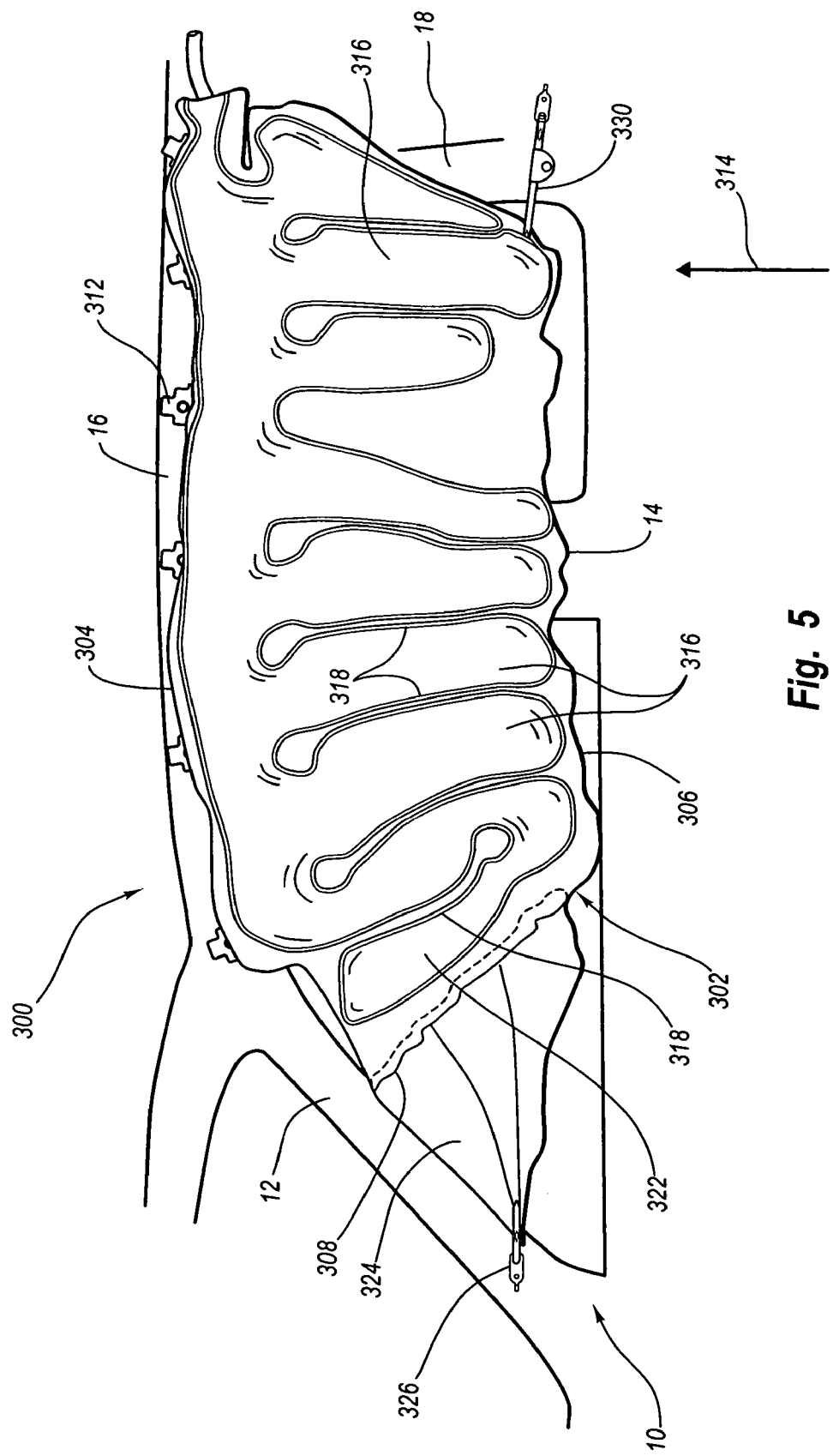
FIG. 5 is a perspective view of the inflatable curtain airbag cushion of FIG. 4, shown in a deployed state within a vehicle.

Referring to FIG. 5, the inflatable curtain airbag module 300 of FIG. 4 is shown in a deployed state within a vehicle 10. The inflatable curtain 302 is shown spanning between the A-pillar 12 and C-pillar 18 of the vehicle 10. Impact protection is also provided across the B-pillar 14. The inflatable curtain 302 provides impact protection and occupant retention during lateral collision or rollover events.

The inflatable curtain 302 may be mounted to, or adjacent to, the roof rail 16 of the vehicle through mounting tabs 312 disposed along the top edge 304 of the curtain 302. The inflatable curtain 302 includes a plurality of top-filling chambers 316 and a bottom-filling chamber 322. The top-filling chambers 316 may be at least partially defined by internal seams 318 that extend from the bottom edge 306, toward, but not reaching the top edge 304. The bottom-filling chamber 322, adjacent the front edge 308, may be at least partially defined by an internal seam 318 extending from the top edge 304, toward, but not reaching the bottom edge 306.

The bottom-filling chamber 322 deploys below the A-pillar 12. In its housed/undeployed state, the bottom-filling chamber 322 may be housed along the A-pillar 12 behind the A-pillar garnish trim. When deployed, the bottom-filling chamber 322 may not receive inflation gas until the top-filling chambers 316 do, and until the curtain 302 deploys out from its housed position. This may help mitigate the possibility of fragmenting the A-pillar trim during deployment of the curtain 302.

The airbag module 300 may also include a sail panel 324 attached to the front edge 308 of the curtain 302. The sail panel 324 may be attached to the curtain at an angle with respect to a direction of compaction 314. The sail panel 324 may also be attached to the vehicle 10 at an attachment location 326, which may be adjacent the A-pillar 12.

Figure 6:
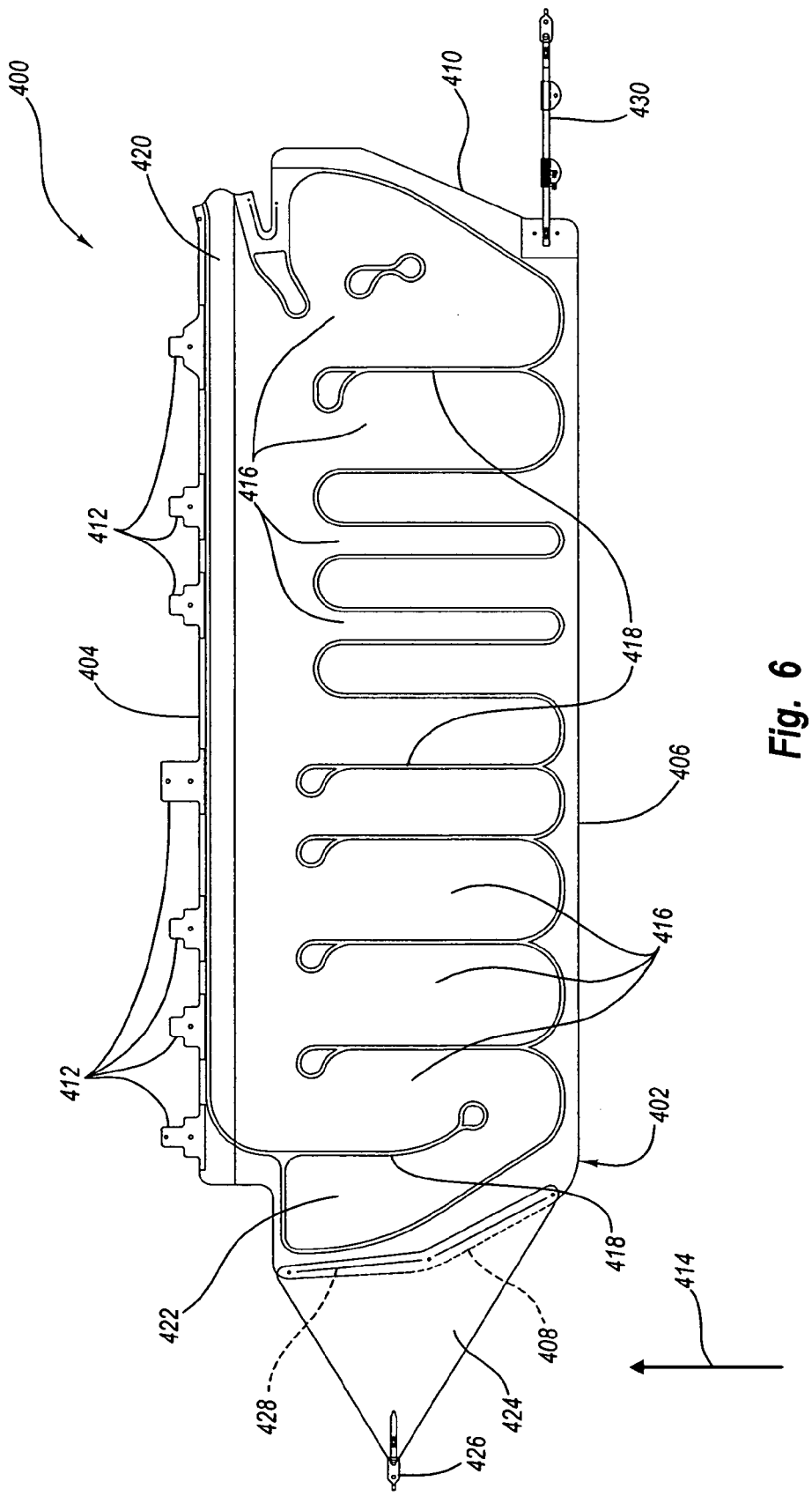
FIG. 6 is a side elevation view of another embodiment of an inflatable curtain airbag cushion.

FIG. 6 represents another embodiment of an inflatable curtain airbag module 400, as shown from a side elevation view in a deployed state. The airbag module 400 is configured to provide impact protection for vehicular occupants between the A-pillar and C-pillar of a vehicle. For example, the airbag module 400 depicted could be used in a crew cab model of a pick-up truck or similar vehicle.

Like the previous embodiments heretofore described, the airbag module 400 includes an inflatable curtain 402 having a top edge 404, a bottom edge 406, a front edge 408 and a back edge 410. A plurality of mounting tabs 412 may be disposed along the top edge 404 for mounting the curtain 402 to a roof rail of the vehicle. Fasteners may engage the mounting tabs 412 and secure the curtain 402 to a desired position along the roof rail. Alternative methods of attachment may also be used, such as mounting clips or brackets as apparent to those having skill in the art.

The inflatable curtain 402 includes a plurality of inflatable chambers for providing impact protection for vehicular occupants. For example, the curtain 402 includes several top-filling chambers 416, which receive inflation gas from an internal gas duct 420 adjacent the top edge 404 of the curtain 402. The internal gas duct 420 may be a passageway formed in the fabric of the inflatable curtain 402, or alternatively, may be a separate, optionally rigid, duct that may be inserted into the inflatable curtain 402.

The top-filling chambers 416 may be partially defined by internal seams 418 that extend from the bottom edge 406 of the curtain 402, toward the top edge 404. However, the seams 418 that define the top-filling chambers 416 may not reach the top edge 404, leaving a gap between the seams 418 and the top edge 404 of the curtain 402.

The inflatable curtain 402 also includes a chamber 422 adjacent its front edge 408. Chamber 422 is configured to extend below and provide impact protection below the A-pillar of the vehicle. Chamber 422 may also extend at an angle relative to a direction of compaction 414 of the inflatable curtain 402. This may help to minimize the envelope size of the inflatable curtain 402 when it is housed adjacent the A-pillar after compaction. Less material of chamber 422 may be folded and/or rolled over on itself during compaction compared to chambers that do not extend at an angle.

Chamber 422 may optionally be bottom-filled by receiving inflation gas from adjacent the bottom edge 406 of the curtain 402. An internal seam 418 extending from the top edge 404 toward, but not reaching, the bottom edge 406 partially defines the bottom-filling chamber 422. Upon activation of the airbag module 400, inflation gas may travel from the internal gas duct 420 and through the adjacent top-filling chamber 416, and then into the bottom-filling chamber 422. According to alternative configurations, inflation gas may be received from between the top and bottom edges 404, 406 of the curtain 402. For example, a gap in the internal seam 418 halfway between top and bottom edges 404, 406 could provide inflation gas into chamber 422 depending upon how quickly chamber 422 is needed to fill.

The airbag module 400 may also include a sail panel 424 and a tether 430 coupled to the inflatable curtain 402. The sail panel 424 may be coupled along the front edge 408 of the curtain 402 by a seam 428, which is set at an angle relative to the direction of compaction 414. The angle may be selected such that during compaction, overlap of a first end of the seam 428 with a second end is avoided. Furthermore, the angle at which the sail panel 424 is attached to the curtain 402 may vary. The sail panel 424 may also be coupled to an attachment location 426 on the vehicle.

Figure 7:
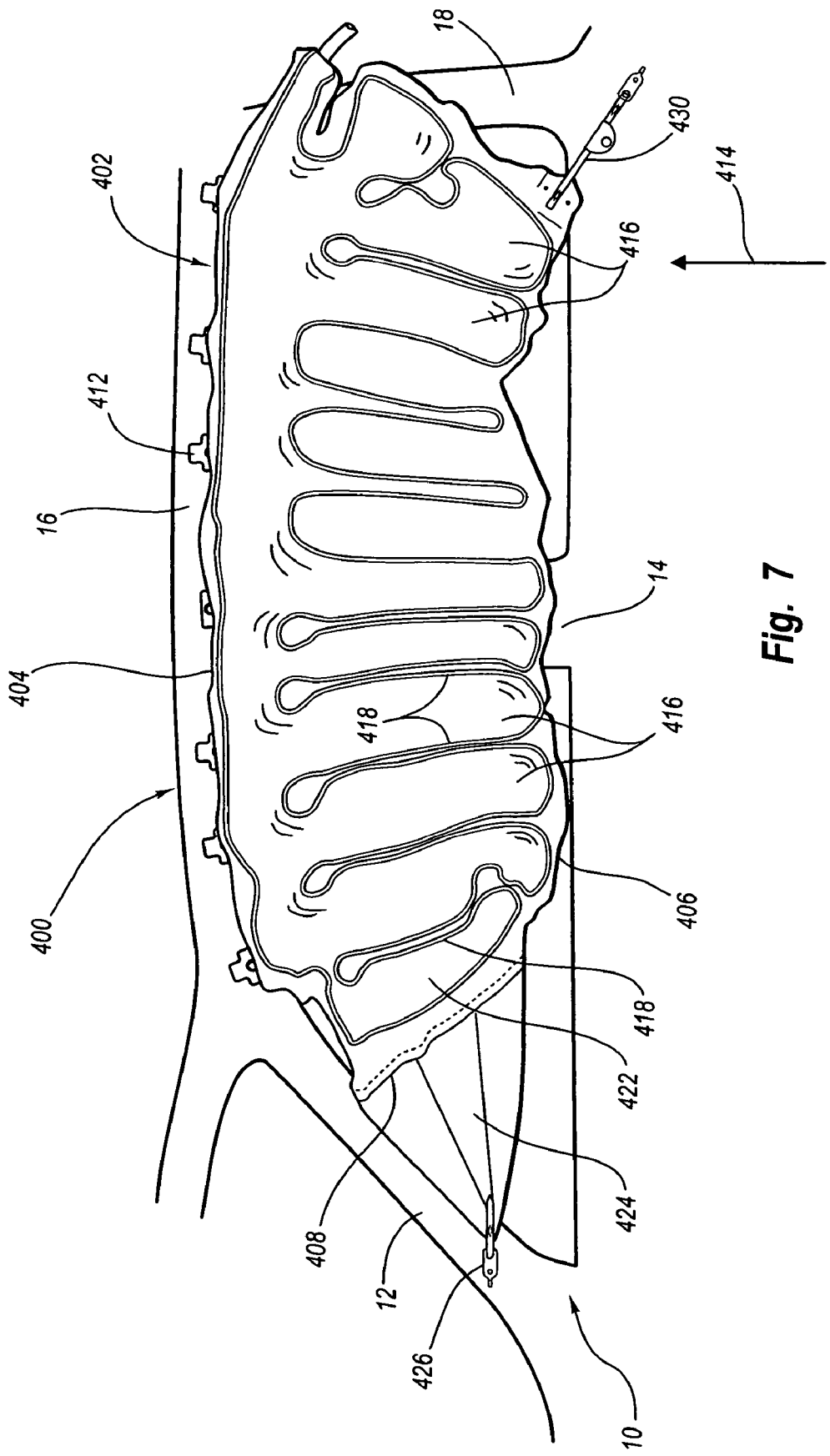
FIG. 7 is a perspective view of the inflatable curtain airbag cushion of FIG. 6, shown in a deployed state within a vehicle.

FIG. 7 represents the inflatable curtain airbag module 400 of FIG. 6, shown from a perspective view, being deployed within a vehicle 10. The inflatable curtain 402 spans from the A-pillar 12, across the B-pillar 14, to the C-pillar 18 of the vehicle 10. The inflatable curtain 402 provides impact protection and occupant retention of vehicular occupants during lateral collision or rollover events.

The inflatable curtain 402 may be mounted to, or adjacent to, the roof rail 16 of the vehicle 10 through mounting tabs 412 disposed along the top edge 404 of the curtain 402. The inflatable curtain 402 includes a plurality of inflatable chambers, some top-filled 416 and some bottom-filled 422, as described in greater detail in conjunction with FIG. 6.

The bottom-filling chamber 422 deploys below the A-pillar 12 and provides impact protection below the A-pillar 12 for a vehicular occupant. In an undeployed state, the bottom-filling chamber 422 may be housed along the A-pillar 12 behind the A-pillar garnish trim. When deployed, the bottom-filled chamber 422 may not become fully inflated until after the top-filling chambers 416 are substantially inflated, and the curtain 402 has moved from its housed position into the cabin of the vehicle 10.

The airbag module 400 may also include a sail panel 424 attached to the front edge 408 of the curtain 402 at an angle with respect to the direction of compaction 414. The sail panel 424 may also be attached to the vehicle 10 at an attachment location 426 adjacent the A-pillar 12.

The airbags, inflatable curtains, cushions and chambers disclosed herein are examples of means for cushioning a vehicular occupant during a lateral collision event. The bottom-filling chambers and chambers that deploy below an A-pillar disclosed herein are examples of means for providing impact protection below an A-pillar of a vehicle. Furthermore, the configurations of the internal seams, bottom-filling inflatable chambers and internal gas ducts disclosed are examples of means for delaying inflation of the impact protection means. Additionally, the angled attachment seams disclosed are examples of means for attaching the impact protection means while minimizing its profile. Moreover, the configuration of the internal seams and internal gas ducts disclosed are examples of means for bottom-filling the impact protection means.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An inflatable curtain airbag module, comprising:
   an inflatable curtain having a top edge and a bottom edge, the inflatable curtain configured to be mounted to a vehicle;
   a plurality of inflatable chambers disposed within the inflatable curtain, such that a first chamber is configured to receive inflation gas from adjacent the top edge of the inflatable curtain and a second chamber is configured to receive inflation gas from adjacent the bottom edge, without receiving inflation gas in the second chamber from the top edge of the inflatable curtain; and
   a sail panel coupled to an attachment location on the vehicle, the sail panel coupled along a front edge of the inflatable curtain by a seam, having a first end and a second end, at an angle with respect to a direction of compaction of the inflatable curtain;
   wherein the second chamber is configured to provide impact protection for a vehicular occupant below an A-pillar of the vehicle.

2. The airbag module of claim 1, wherein the second chamber is configured to be housed along the A-pillar when the inflatable curtain module is in an undeployed state.

3. The airbag module of claim 2, wherein during deployment, the second chamber is filled with inflation gas after it has moved from its housed position along the A-pillar.

4. The airbag module of claim 1, wherein the second chamber, in a deployed state, extends at an angle with respect to a direction of compaction of the inflatable curtain.

5. The airbag module of claim 1, wherein the inflatable curtain is configured to provide impact protection for the vehicular occupant between the A-pillar and a B-pillar of the vehicle.

6. The airbag module of claim 1, wherein the inflatable curtain is configured to provide impact protection for the vehicular occupant between the A-pillar and a C-pillar of the vehicle.

7. The airbag module of claim 1, wherein the angle varies along the front edge of the inflatable curtain.

8. The airbag module of claim 1, wherein the angle prevents overlap of the first end of the seam with the second end of the seam during compaction of the inflatable curtain.

9. An inflatable curtain airbag module for providing impact protection along a side of a vehicle, the airbag module comprising:
   an inflatable curtain having a top edge, a bottom edge, a front edge, a back edge and a plurality of inflatable chambers disposed therein, such that a chamber adjacent the front edge is configured to deploy below an A-pillar of the vehicle; and a sail panel attached to the front edge of the inflatable curtain at an angle with respect to a direction of compaction of the inflatable curtain, the sail panel also configured to be coupled to an attachment location on the vehicle wherein the angle varies along the front edge of the inflatable curtain.

10. The airbag module of claim 9, wherein the sail panel is attached to the front edge of the inflatable curtain along a seam, such that the angle prevents overlap of a first end of the seam with a second end of the seam during compaction of the inflatable curtain.

11. The airbag module of claim 9, wherein the plurality of inflatable chambers are at least partially defined by internal seams that extend from the bottom edge of the inflatable curtain toward, but not reaching, the top edge, except that the chamber adjacent the front edge is at least partially defined by an internal seam that extends from the top edge toward, but not reaching, the bottom edge.

12. The airbag module of claim 11, wherein the chamber adjacent the front edge is configured to receive inflation gas after inflation gas is received by the plurality of inflatable chambers during deployment of the airbag.

13. The airbag module of claim 9, wherein the chamber adjacent the front edge is configured to be disposed behind trim on the A-pillar, when in an undeployed state.

14. The airbag module of claim 13, wherein the chamber adjacent the front edge is filled with inflation gas after it has moved out from behind the trim on the A-pillar during deployment.

15. An inflatable curtain airbag module for providing impact protection along a side of a vehicle, the airbag module comprising:

an inflatable curtain having a top edge, a bottom edge, a front edge, a back edge and a plurality of inflatable chambers disposed therein, such that a chamber adjacent the front edge is configured to deploy below an A-pillar of the vehicle; and a sail panel attached to the front edge of the inflatable curtain at an angle with respect to a direction of compaction of the inflatable curtain, the sail panel also configured to be coupled to an attachment location on the vehicle;

wherein the plurality of inflatable chambers are at least partially defined by internal seams that extend from the bottom edge of the inflatable curtain toward, but not reaching, the top edge, except that the chamber adjacent the front edge is at least partially defined by an internal seam that extends from the top edge toward, but not reaching, the bottom edge.

* * * * *